United States Patent [19]

Ezure

[11] 4,124,095
[45] Nov. 7, 1978

[54] FORK LIFT TRUCK DRIVEN BY INTERNAL COMBUSTION ENGINE

[75] Inventor: Toshikazu Ezure, Musashi-murayama, Japan

[73] Assignee: Nissan Motor Company, Ltd., Japan

[21] Appl. No.: 773,951

[22] Filed: Mar. 3, 1977

[30] Foreign Application Priority Data

Mar. 4, 1976 [JP] Japan .................................. 51-22678

[51] Int. Cl.² .............................................. B66F 9/22
[52] U.S. Cl. .................................... 187/9 R; 60/431; 60/433; 180/77 R; 187/28
[58] Field of Search ................... 187/9 R, 9 E, 17, 28, 187/1 R; 214/660, 670, 671, 672, 673, 674; 180/53 R, 66 R, 77 R; 200/61.86; 60/431, 433

[56] References Cited

U.S. PATENT DOCUMENTS

| | | | |
|---|---|---|---|
| 2,228,393 | 1/1941 | Leaming | 180/77 R X |
| 3,014,344 | 12/1961 | Arnot | 60/433 |
| 3,022,849 | 2/1962 | Braun | 180/77 R |
| 3,059,715 | 10/1962 | Lopez | 180/77 R |
| 3,098,543 | 7/1963 | Hastings | 180/77 R X |
| 3,139,204 | 6/1964 | Olson | 60/431 X |
| 3,248,869 | 5/1966 | Kittler | 60/431 |
| 3,476,273 | 11/1969 | Jones et al. | 60/431 X |

FOREIGN PATENT DOCUMENTS 1,118,024  11/1961  Fed. Rep. of Germany ........ 180/77 R

*Primary Examiner*—Evon C. Blunk
*Assistant Examiner*—James L. Rowland

[57] ABSTRACT

The carriage of a fork lift truck is actuated by the action of hydraulic fluid controllably supplied through a manually operated control system from a pump driven by an internal combustion engine having a carburetor. The throttle valve of the carburetor is partially opened in response to the operation of the control system in order to increase the discharge amount of the hydraulic fluid of the pump during idling of the engine.

4 Claims, 5 Drawing Figures

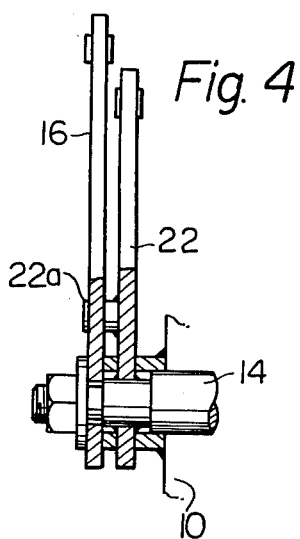
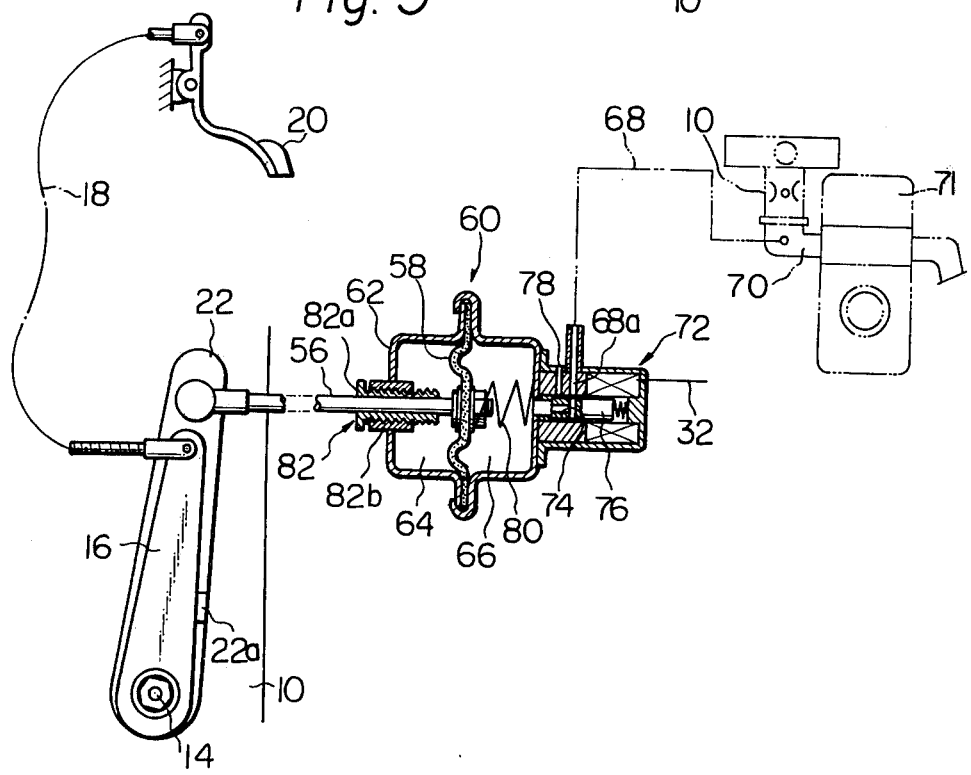

FORK LIFT TRUCK DRIVEN BY INTERNAL COMBUSTION ENGINE

BACKGROUND OF THE INVENTION

1. Field of the Invention

This invention relates to a fork lift truck operated by an internal combustion engine and having a carriage which is mounted for movement along the vertically disposed mast or boom carried at the front of the fork lift truck and wherein the carriage is equipped with fork or fork tines that are adapted and arranged to be extended under a load, generally supported by a pallet, which is to be transported from one point to another.

2. Description of the Prior Art

In connection with a fork lift truck driven by an internal combustion engine, it is well known in the art that a hydraulic pump driven by the engine is arranged to supply pressurized hydraulic fluid into a power steering system for decreasing the turning effort of an operator during steering operation of the fork lift, and hydraulic cylinders for lifting the carriage of the fork lift and for tilting a vertically disposed tiltable mast of the fork lift along which the carriage is movably mounted. The fork lift truck of this type has encountered the following problems: during idling of the fork lift truck engine, the engine speed is relatively low and accordingly the amount of the hydraulic fluid discharged from the engine driven pump is decreased below a desirable level, causing a shortage of hydraulic fluid in the hydraulic cylinders for operating the carriage. This shortage of the hydraulic fluid results in lowering the operational speed of the carriage and the tiltable vertical mast along which the carriage is movably disposed.

Furthermore, the hydraulic system of the fork lift truck is arranged such that the power steering system can be preferentially supplied with the hydraulic fluid in order to always obtain secure steering operation. With this connection, the hydraulic fluid always flows through the power steering system. This brings about a further shortage of the hydraulic fluid for actuating the carriage and the tiltable vertical mast, causing the further lowering of the operational speed of the carriage and the tiltable vertical mast.

The thus induced lowering of the operational speed invites inefficiencies in loading and transporting loads. Therefore, in order to obtain the necessary operational speed of the the carriage during the idling condition of the engine, the operator is required to increase the engine speed by operating the accelerator. This accelerator operation troubles the operator, increasing his fatigue.

SUMMARY OF THE INVENTION

It is the prime object of the present invention to provide an improved fork lift truck which can load and transport loads quickly even during idling of its engine, without invitation of increased fatigue of the operator by requiring him to manually increase the engine speed of the fork lift truck.

Another object of the present invention is to provide an improved fork lift truck in which the operational speed of its load carrying device is automatically increased even during idling of its engine in response to the operation of a hydraulic system for actuating the load carrying device.

A further object of the present invention is to provide an improved fork lift truck driven by an internal combustion engine, in which the engine output power and the engine speed are automatically increased during idling of the engine in response to the operation of a control device for controlling a hydraulic system which actuates the load carrying device, without the operation of the accelerator of the engine.

A still further object of the present invention is to provide an improved fork lift truck driven by an internal combustion engine, in which the throttle valve of the carburetor of the engine is arranged to partially open during idling of the engine in response to the operation of a manually operated control device for controlling a hydraulic system which actuates the load carrying device, whereby the engine output power and the engine speed can be increased to obtain the necessary amount of the hydraulic fluid discharged from the engine driven pump, without the operation of the accelerator of the engine.

Other objects, features, and advantages of the fork lift truck in accordance with the present invention will become more apparent from the following description of the preferred embodiments thereof taken in conjunction with the accompanying drawings, in which like reference numerals designate like parts and elements.

BRIEF DESCRIPTION OF THE DRAWINGS

FIG. 4 is a cross-sectional view taken along the line B—B of FIG. 3; and

FIG. 5 is a schematic illustration of a part of a further preferred embodiment of the fork lift truck in accordance with the present invention.

DESCRIPTION OF THE PREFERRED EMBODIMENTS

Figure 1:
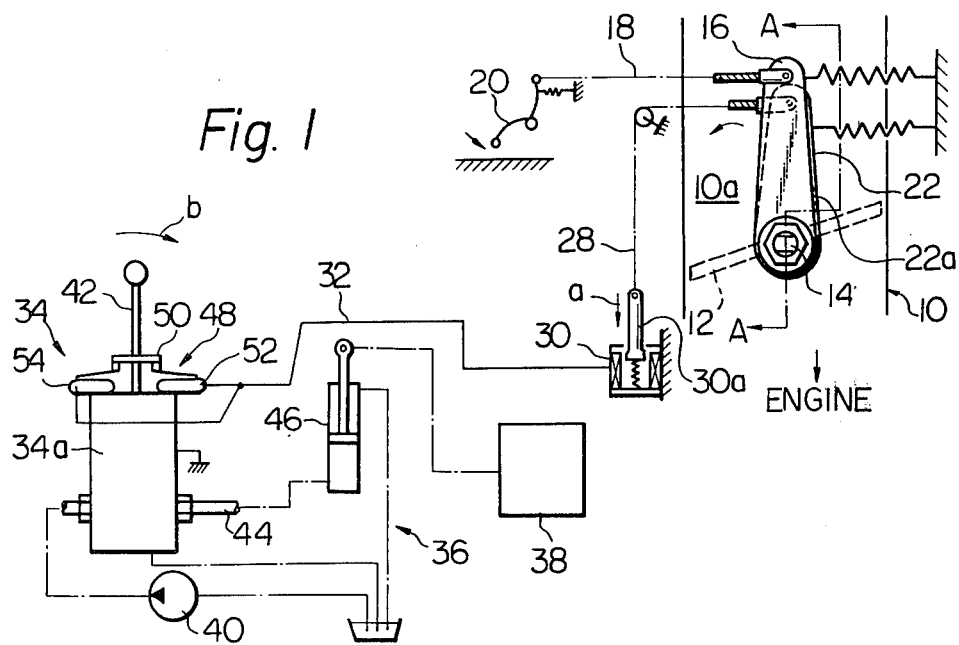
FIG. 1 is a schematic illustration of a part of a preferred embodiment of a fork lift truck according to the present invention.
Figure 2:
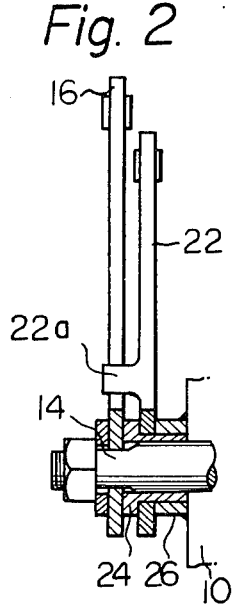
FIG. 2 is a cross-sectional view taken along the line A—A of FIG. 1.

Referring now to FIGS. 1 and 2, a part of a preferred embodiment of a fork lift truck in accordance with the present invention is shown as including a carburetor 10 for supplying an air-fuel mixture to an internal combustion engine (not shown) mounted on the body of the fork lift truck. The carburetor 10 is composed of a throttle valve 12 fixed on a throttle valve shaft 14 rotatably disposed in the body of the carburetor. The throttle valve 12 is accordingly rotatably disposed in the air-fuel mixture induction passage 10a of the carburetor, the passage 10a being communicated with the combustion chamber or chambers of the engine though not shown.

A throttle lever 16 or a first lever is fixed on the throttle valve shaft 14. The throttle lever 16 is connected by a wire 18 to an accelerator 20 or an acceleration pedal, and normally urged to the right (in the drawing) or in the direction to fully close the throttle valve 12 by the action of a spring (no numeral). An auxiliary lever 22 or a second lever is rotatably mounted on the throttle valve shaft 14 through a bush 24 disposed around the throttle valve shaft 14 clearly shown in FIG. 2. The reference numeral 26 indicates a spacer for maintaining the auxiliary lever 22 at a desired position. The auxiliary lever 22 is formed with a projection 22a or a stop engageable with the right side (in the drawing) of the throttle lever 16. The auxiliary lever 22 is connected by a wire 28 to a movable actuating rod 30a of a solenoid actuator 30 or an electromagnetic actuator. The solenoid actuator 30 is arranged to be energized to move the actuating rod 30a in the direction indicated by the arrow a when supplied with an electric current through a line 32.

Indicated by the reference numeral 34 is a control device or a manually operated control means for controlling a hydraulic system 36 which actuates a load carrying device 38 of the fork lift. The load carrying device 38 includes a carriage mounted for movement along a vertically disposed mast or boom carried at the front of the fork lift truck though not shown. The carriage is, as usual, equipped with outwardly projecting forks or fork tines that are adapted and arranged to be extended under a load, generally supported by a pallet, which is to be transported from one point to another, though not shown. The control device 34 has, in its proper 34a, a control valve (not shown) changing the path of hydraulic fluid from a pump 40 driven by the engine. The control valve is arranged to be operated by a hand-operated control lever 42 mechanically connected to the control valve. In this case, the control valve is arranged to be operated to allow the hydraulic fluid from the pump 40 to be admitted through a pipe 44 into a hydraulic cylinder 46 when the control lever 42 is moved or tilted by the operator in the direction indicated by the arrow b. The hydraulic cylinder 46 functions to tilt the vertically disposed mast along which the carriage is movably mounted, or move the carriage along the vertical mast. It will be noted that the fluid from the pump 40 is also admitted to a power steering system (not shown) to apply hydraulic power in addition to manual power in steering of the fork lift truck.

The control device 34 is equipped with a switching device 48 or switching means for supplying therethrough electric current to energize the solenoid actuator 30. The switching device 48 is composed of a plate 50 fixed to the hand-operated control lever 42. The plate 50 is connected to a first limit switch 52 and a second limit switch 54 through connecting members (no numerals). The switching device 48 is arranged to close the first limit switch to supply the solenoid actuator 30 with electric current through the line 32 when the control lever 42 is moved by the operator in the direction indicated by the arrow b to admit the hydraulic fluid into the hydraulic cylinder 46.

In operation, when the hand-operated control lever 42 is tilted by the operator in the direction b to operate or move the device 38, the first limit switch 52 is closed to supply electric current to the solenoid actuator 30 through the line 32. Then, the solenoid actuator 30 is energized to move its actuating rod 30a in the direction a and accordingly the auxiliary lever 22 is forced to rotate counterclockwise (in the drawing) via the wire 28. It will be understood that the auxiliary lever 22 is moved by a predetermined amount corresponding to the stroke of the actuating rod 30a of the solenoid actuator 30. The movement of the auxiliary lever 22 causes its stop 22a to engage with the throttle lever 16, forcing the throttle lever 16 to rotate counterclockwise. As a result, the throttle valve 12 is moved or rotated counterclockwise (in the drawing) to partially open from the fully closed position by a predetermined amount for increasing the engine output power and the engine speed to desired levels. This increases the amount of the hydraulic fluid discharged from the hydraulic pump 40 driven by the engine and therefore the hydraulic cylinder 46 is supplied with sufficient hydraulic fluid, operating, at sufficiently high speed, the carriage and the vertical mast along which the carriage is movably disposed. It is to be noted that the engine speed is preferably increased to a level of 1,000 to 12,000 r.p.m. by the above-mentioned predetermined amount of throttle valve opening. It will be appreciated that the gears of the transmission of the engine are shiftable in the abovementioned engine speed range and accordingly the control of the fork lift truck cruising speed is unrestricted.

While only one example of the switching device 48 has been shown and described, the switching device 48 may be of the type in which a switch disposed at an upper portion of the control lever 42 is closable in responce to the tilting movement of the lever 42, or of the type in which a pressure responsive switch is disposed in the pipe 44 connecting the control device 34 and the hydraulic cylinder 46 to energize the solenoid actuator 30 by sensing the increase of the hydraulic pressure in the pipe 44.

Figure 3:
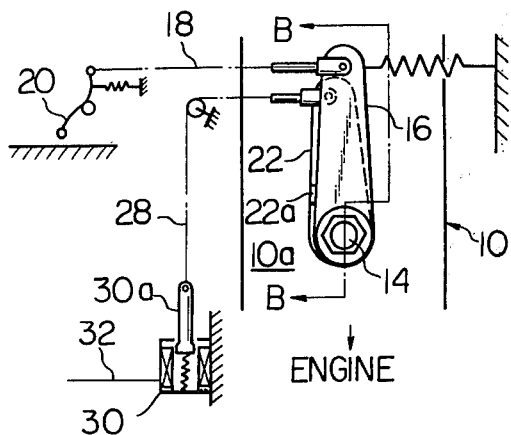
FIG. 3 is a schematic illustration of a part of another preferred embodiment of the fork lift truck in accordance with the present invention.

FIGS. 3 and 4 show a part of another preferred embodiment of the fork lift truck in accordance with the present invention. This fork lift truck is similar to the embodiment shown in FIGS. 1 and 2 with the exception that the throttle lever 16 is rotatably mounted on the throttle valve shaft 14 and the auxiliary lever 22 is fixed on the throttle valve shaft 14 as clearly seen in FIG. 4. Consequently, the stop 22a or the projection is formed with the auxiliary lever 22 so as to be engageable with the left side (in the drawing) of the throttle lever 16.

With this arrangement, when the solenoid actuator 30 is energized to move the actuating rod 30a, the auxiliary lever 22 is forced to move counterclockwise by the wire 28. Accordingly, the throttle valve (not shown) is rotated counterclockwise to open by the predetermined amount, increasing the engine output power and the engine speed. It will be understood that the throttle and auxiliary levers 16 and 22 may be integral with each other to obtain similar effect to the embodiment of FIGS. 3 and 4. It will be seen from the foregoing that the throttle valve can be moved through the throttle lever 16 by the accelerator 20 though the throttle lever 16 is rotatably mounted on the throttle valve shaft 14 on which the throttle valve is fixed, since the throttle lever 16 can be engaged with the stop 22a of the auxiliary lever 22 fixed on the throttle valve shaft 14.

FIG. 5 shows a part of a further embodiment of the fork lift truck according to the present invention, similar to the previously described embodiments except that the auxiliary lever 22 is actuated by the effect of engine intake vacuum and a spring. In this case, the throttle lever 16 is fixed on the throttle valve shaft 14 and the auxiliary lever 22 is rotatably mounted on the throttle shaft 14. As shown, the auxiliary lever 22 is formed with the stop 22a or the projection which is engageable with the right side (in the drawing) of the throttle lever 16. The auxiliary lever 22 is mechanically connected through a connecting rod 56 to a diaphragm 58 of a diaphragm actuator 60. The diaphragm 58 divides the inside of a casing 62 of the actuator 60 into an atmospheric chamber 64 communicated with the atmospheric air and a vacuum chamber 66 communicable through a vacuum passageway 68 with a vacuum source such as an intake passage 70 connecting the carburetor 10 and the engine 71.

Secured to the casing 62 of the diaphragm actuator 60 is a solenoid or electromagnetic valve 72 which is arranged to be energized when supplied with the electric current through the switching means 48 (not shown). The solenoid valve 72 is formed with the bore 74 in which a valve member 76 or a spool is slidably and movably disposed. The solenoid valve 72 is further formed with a part 68a of a vacuum passageway 68 and a vent hole 78 through which the bore 74 is communicable with the atmospheric air. The bore 74 is communicated with the vacuum chamber 66 of the diaphragm actuator 60 and accordingly it will be understood that the bore 74 forms part of the vacuum passageway 68. The solenoid valve 72 in this case is arranged such that its valve member 76 is moved in the direction to close the vacuum passageway 68 and open the vent hole 78 so as to supply the vacuum chamber 66 with atmospheric air when energized, and is moved in the opposite direction to open the vacuum passageway 68 and close the vent hole 78 so as to supply the vacuum chamber with vacuum from the intake passage 70 when de-energized. A spring 80 disposed in the vacuum chamber 66 functions to urge the auxiliary lever 22 counterclockwise (in the drawing) through the connecting rod 56 when the vacuum chamber 66 is supplied with the atmospheric air through the vent hole 78.

The reference numeral 82 represents an adjusting device for controlling the stroke of the connecting rod 56. The adjusting device 82 is composed of a cylindrical member 82a slidably disposed around the connecting rod 56. The cylindrical member 82a is formed, on its outer surface, with a threaded portion (no numeral) which is engaged with the threaded portion (no numeral) formed on the inner surface of a cylindrical member 82b fixed to the casing 62 of the diaphragm actuator 60.

With this arrangement, when the solenoid valve 72 is de-energized without supply of the electric current, the vacuum is fed through the vacuum passageway 68 into the vacuum chamber 66 of the diaphragm actuator 60. Accordingly, the diaphragm 64 pulls the auxiliary lever 22 through the connecting rod 56 clockwise (in the drawing). On the contrary, when the hand-operated control lever 42 is moved by the operator in the direction b to operate the carriage 38 causing the switch 52 to close (shown in FIG. 1), the electric current is supplied to the solenoid valve 72 to energize it. Then, the supply of the vacuum is stopped and the atmospheric air is supplied to the vacuum chamber 66 through the vent hole 78. As a result, the connecting rod 56 is pushed by the action of the spring 80 to the left (in the drawing) and consequently the auxiliary lever 22 is rotated counterclockwise to rotate the throttle lever 16, causing the stop 22a to engage with the throttle lever 16. Therefore, the throttle valve fixed on the shaft 14 is moved to open by the predetermined amount corresponding to the connecting rod stroke. It will be understood that, by the predetermined amount of the throttle valve opening, the engine output power and the engine speed are increased to the desired levels.

What is claimed is:

1. A system for controlling a load carrying device of a fork lift truck driven by an internal combustion engine, comprising:

a carburetor having a throttle valve fixed to a throttle valve shaft disposed in said carburetor, said throttle valve being rotatably disposed in the air-fuel mixture induction passage of said carburetor, and a first lever fixedly mounted on the throttle valve shaft and mechanically connected to an accelerator of the engine;

a manually operated control means for controlling the operation of the load carrying device, said manually operated control means including switching means for supplying therethrough electric current when a manually operable member of said manually operated control means is operated to operate the load carrying device; and means for partially opening said throttle valve by a predetermined amount from the fully closed position of said throttle valve in response to the movement of said manually operated control means, whereby the engine output power and engine speed are increased to increase the speed of the operation of the load carrying device, the throttle valve opening means including a second lever rotatably connected to the throttle valve shaft and having a stop which is engageable with said first lever, a diaphragm actuator including a casing, a diaphragm which divides the inside of the casing into an atmospheric chamber communicated with atmospheric air and a vacuum chamber communicated with a vacuum source through a vacuum passageway connecting the vacuum chamber to the vacuum source, a connecting rod connecting said diaphragm and said second lever, and a spring disposed in said casing to normally urge said connecting rod in the direction that the stop of said second lever is engaged to cause said first lever to rotate in the direction for opening the throttle valve by the predetermined amount, and a solenoid valve arranged to open the vacuum passageway to establish communication between the vacuum chamber and the vacuum source, or close the vacuum passageway to block the communication therebetween in response to the electric current supplied through said switching means.

2. A system as claimed in claim 1, in which said vacuum source includes an intake passage connecting said carburetor and the engine.

3. A system as claimed in claim 2, in which a part of the vacuum passageway is formed through said solenoid valve, in which said solenoid valve is formed with a vent hole communicating the vacuum chamber of said diaphragm actuator and atmospheric air, the communication between the vacuum chamber and the atmospheric air being established when said vent hole is opened.

4. A system as claimed in claim 3, in which said switching means includes a mechanically operated switch mechanically connected to the manually operable member for operating the manually operated control means, said mechanically operated switch being arranged to close, to supply the electric current therethrough when the manually operable member is moved into a position to operate the load carrying device of the fork lift truck, in which said solenoid valve is arranged to be energized to close the vacuum passageway and open the vent hole.

* * * * *